US009649981B2

(12) United States Patent
Hiraoka et al.

(10) Patent No.: US 9,649,981 B2
(45) Date of Patent: May 16, 2017

(54) DOOR MIRROR FOR VEHICLE (71) Applicant: KABUSHIKI KAISHA HONDA LOCK, Miyazaki-shi, Miyazaki (JP)

(72) Inventors: Michiru Hiraoka, Miyazaki (JP); Yasuyuki Eto, Miyazaki (JP)

(73) Assignee: KABUSHIKI KAISHA HONDA LOCK, Miyazaki (JP)

( * ) Notice: Subject to any disclaimer, the term of this patent is extended or adjusted under 35 U.S.C. 154(b) by 324 days.

(21) Appl. No.: 14/477,176

(22) Filed: Sep. 4, 2014

(65) Prior Publication Data
US 2015/0116165 A1 Apr. 30, 2015

(30) Foreign Application Priority Data

Oct. 30, 2013 (JP) .................. 2013-225779

(51) Int. Cl.
*H01Q 1/32* (2006.01)
*B60R 1/06* (2006.01)
*G02B 7/182* (2006.01)

(52) U.S. Cl.
CPC .............. *B60R 1/06* (2013.01); *G02B 7/1827* (2013.01); *H01Q 1/3266* (2013.01)

(58) Field of Classification Search
CPC .................................................... H01Q 1/3266
USPC ........................................................ 343/713
See application file for complete search history.

(56) References Cited

U.S. PATENT DOCUMENTS

2009/0058759 A1* 3/2009 Morikawa ............... H01P 5/085
343/906
2012/0236387 A1* 9/2012 Bugno .................... B60R 1/088
359/267

FOREIGN PATENT DOCUMENTS

JP 2013-119276 6/2013

* cited by examiner

*Primary Examiner* — Graham Smith
*Assistant Examiner* — Andrea Lindgren Baltzell
(74) *Attorney, Agent, or Firm* — Rankin, Hill & Clark LLP (57) ABSTRACT

A door mirror for a vehicle includes: a mirror housing; a housing body disposed in the mirror housing and configured to house a mirror; a lower cover disposed in the mirror housing and covers a lower section of the housing body from below; a plurality of lower cover side engagement claws vertically disposed on an inner surface of the lower cover and extending in a vertical direction; lower cover locking sections disposed in the housing body and respectively engaged with the plurality of lower cover side engagement claws; and engagement claw restricting sections, each of which is disposed in the housing body and approaches and faces at least one of the lower cover side engagement claws from above, the lower cover side engagement claws being respectively engaged with the lower cover locking sections.

8 Claims, 10 Drawing Sheets

DOOR MIRROR FOR VEHICLE

CROSS-REFERENCE TO RELATED APPLICATION

This application claims priority from Japanese Patent Application No. 2013-225779 filed with the Japan Patent Office on Oct. 30, 2013, the entire content of which is hereby incorporated by reference.

BACKGROUND

1. Technical Field

The present disclosure relates to a door mirror for a vehicle.

2. Related Art

A mirror housing of a door mirror for a vehicle is configured to include, for example, a housing body housing a mirror and a plurality of covers attached to the housing body. The covers include at least a lower cover covering a lower section of the housing body from below.

The door mirror for a vehicle having the housing body housing the mirror and the plurality of covers covering the hosing body has already been known as disclosed in, for example, JP-A-2013-119276. In the door mirror for a vehicle described in the bulletin, each of the covers is engaged with the housing body by claw engagement.

SUMMARY

A door mirror for a vehicle includes: a mirror housing; a housing body disposed in the mirror housing and configured to house a mirror; a lower cover disposed in the mirror housing and covers a lower section of the housing body from below; a plurality of lower cover side engagement claws vertically disposed on an inner surface of the lower cover and extending in a vertical direction; lower cover locking sections disposed in the housing body and respectively engaged with the plurality of lower cover side engagement claws; and engagement claw restricting sections, each of which is disposed in the housing body and approaches and faces at least one of the lower cover side engagement claws from above, the lower cover side engagement claws being respectively engaged with the lower cover locking sections.

DETAILED DESCRIPTION

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the door mirror for a vehicle that is disclosed in JP-A-2013-119276, when an impact is applied to the cover while for example a high-pressure washer is used to wash a vehicle, engagement of the cover with the housing body may be disengaged, and the cover may be detached from the housing body.

An object of the disclosure is to provide a door mirror for a vehicle that can prevent a lower cover from being detached from a housing body even when an upward impact is applied to the lower cover that covers a lower section of the housing body from below.

A door mirror for a vehicle in a first embodiment of the present disclosure includes: a mirror housing; a housing body disposed in the mirror housing and configured to house a mirror; a lower cover disposed in the mirror housing and covers a lower section of the housing body from below; a plurality of lower cover side engagement claws vertically disposed on an inner surface of the lower cover and extending in a vertical direction; lower cover locking sections disposed in the housing body and respectively engaged with the plurality of lower cover side engagement claws; and engagement claw restricting sections, each of which is disposed in the housing body and approaches and faces at least one of the lower cover side engagement claws from above, the lower cover side engagement claws being respectively engaged with the lower cover locking sections.

The door mirror for a vehicle in a second embodiment according to the first embodiment of the present disclosure further includes: a rib disposed on and protruded from the inner surface of the lower cover; and a rib restricting section disposed in the housing body and configured to abut against the rib from above and position and hold a side turn lamp.

The door mirror for a vehicle in a third embodiment according to the first or second embodiment of the present disclosure further includes: an upper cover disposed in the mirror housing and configured to cover the housing body in the opposite direction from the mirror; a plurality of upper cover side engagement claws disposed on and protruded from an inner surface of the upper cover and projected to the housing body side; a plurality of upper cover locking sections disposed in the housing body in a manner capable of being respectively engaged with the plurality of upper cover side engagement claws; and a restricting projection disposed in at least one of the plurality of upper cover side engagement claws and configured to restrict movement of the upper cover to a side that approaches the housing body by abutting against the housing body.

According to the first aspect of the disclosure, the plurality of lower cover side engagement claws that extend vertically is disposed on the inner surface of the lower cover. Furthermore, the housing body is provided with the lower cover locking sections configured to engage the plurality of lower cover side engagement claws. Moreover, the housing body is provided with the engagement claw restricting section. This engagement claw restricting section approaches and faces at least one of the lower cover side engagement claws from above. Thus, even when the upward impact is applied to the lower cover, the engagement claw restricting section restricts upward movement of at least one of the lower cover side engagement claws, that is, upward movement of the lower cover. Therefore, the engagement state of the lower cover with the housing body is maintained. Consequently, the lower cover is suppressed from being easily detached from the housing body.

According to the second aspect of the disclosure, the housing body is provided with the rib restricting section that abuts against the rib from above, the rib being disposed on and protruded from the inner surface of the lower cover. Thus, even when the upward impact is applied to the lower cover, the engagement state of the lower cover with the housing body is further reliably maintained. In addition, the rib restricting section is configured to position and hold the side turn lamp. Thus, there is no need to separately form in the housing body a positioning and holding section for the side turn lamp and a restricting section that restricts the upward movement of the lower cover. Therefore, the shape of the housing body can be suppressed from becoming complicated.

According to the third aspect of the disclosure, the plurality of upper cover side engagement claws is disposed on and protruded from the inner surface of the upper cover that covers the housing body in the opposite direction from the mirror. These upper cover side engagement claws are respectively engaged with the upper cover locking sections of the housing body. In addition, the restricting projection disposed in at least one of the upper cover side engagement claws restricts movement of the upper cover to the side that approaches the housing body by abutting against the housing body. Thus, even when an impact to the side that approaches the housing body is applied to the upper cover, the movement of the upper cover is restricted. Consequently, the engagement state of the upper cover with the housing body is maintained. Therefore, the upper cover is suppressed from being easily detached from the housing body.

Figure 1:
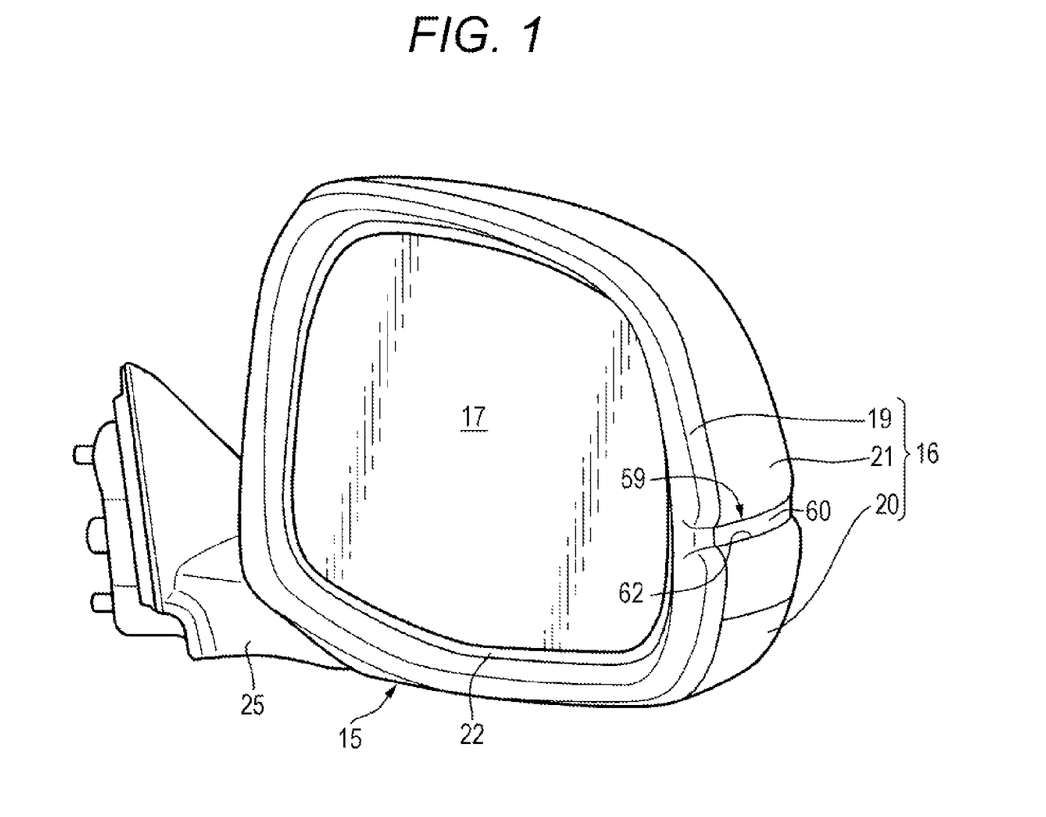
FIG. 1 is a perspective view of a door mirror for a vehicle.
Figure 2:
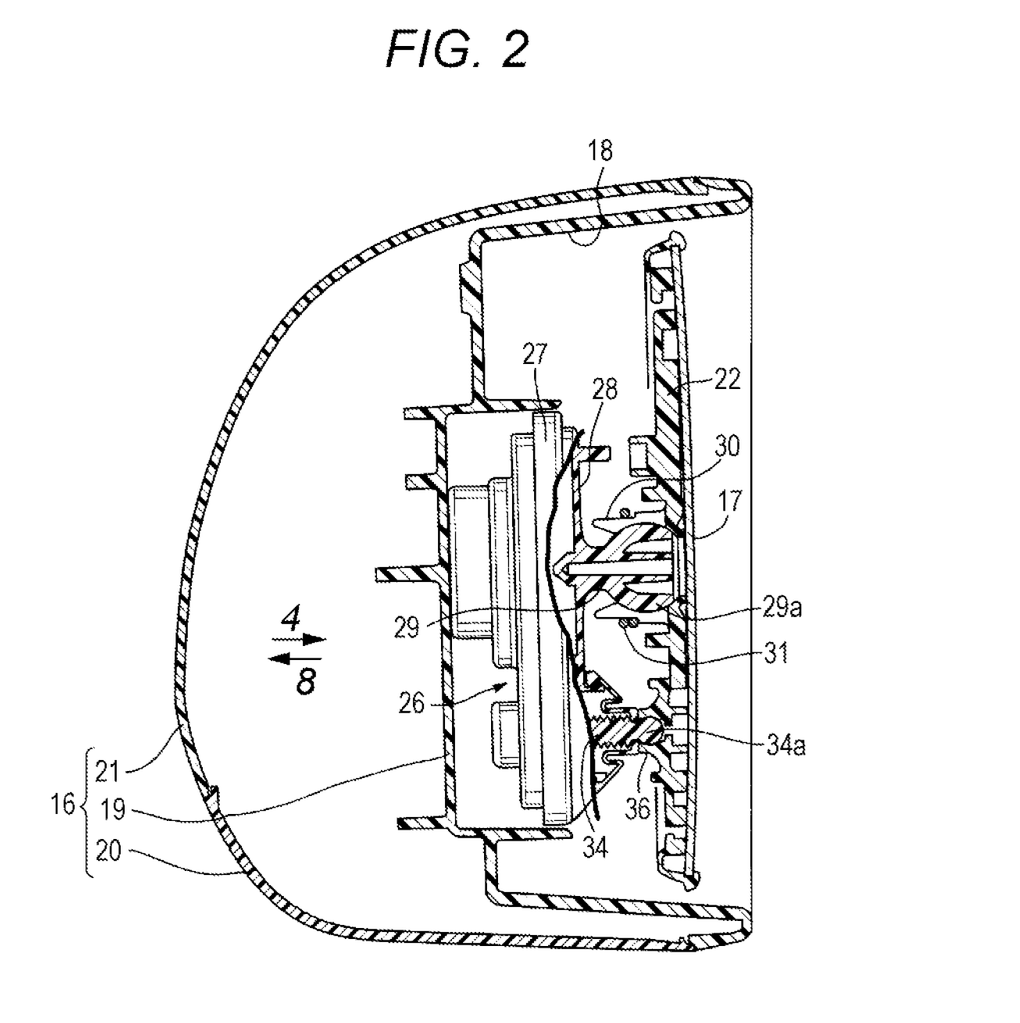
FIG. 2 is a vertical cross-sectional view of the door mirror for a vehicle and is a cross-sectional view that is taken along line 2-2 in FIG. 4.

A description will hereinafter be made on an embodiment of the disclosure with reference to accompanying FIG. 1 to FIG. 13. First, as shown in FIG. 1 and FIG. 2, a door mirror 15 is supported to be storable by a side door of a four-wheel passenger vehicle. A mirror housing 16 of the door mirror 15 includes a housing body 19 and a plurality of covers attached to the housing body 19. The housing body 19 is made of a synthetic resin and has a recessed mirror-housing section 18 that houses a mirror 17. The plurality of covers includes at least a lower cover 20 that covers a lower section of the housing body 19 from below. In this embodiment, the mirror housing 16 includes the housing body 19, the lower cover 20 that is made of the synthetic resin, and an upper cover 21 that is made of the synthetic resin. Separately from the lower cover 20, the upper cover 21 covers the housing body 19 in the opposite direction from the mirror 17.

The mirror 17 that is used to visually recognize a rear side of the vehicle and a mirror holder 22 that holds the mirror 17 and is made of the synthetic resin are arranged in an opening of the housing body 19, that is, an opening end of the recessed mirror-housing section 18.

Figure 3:
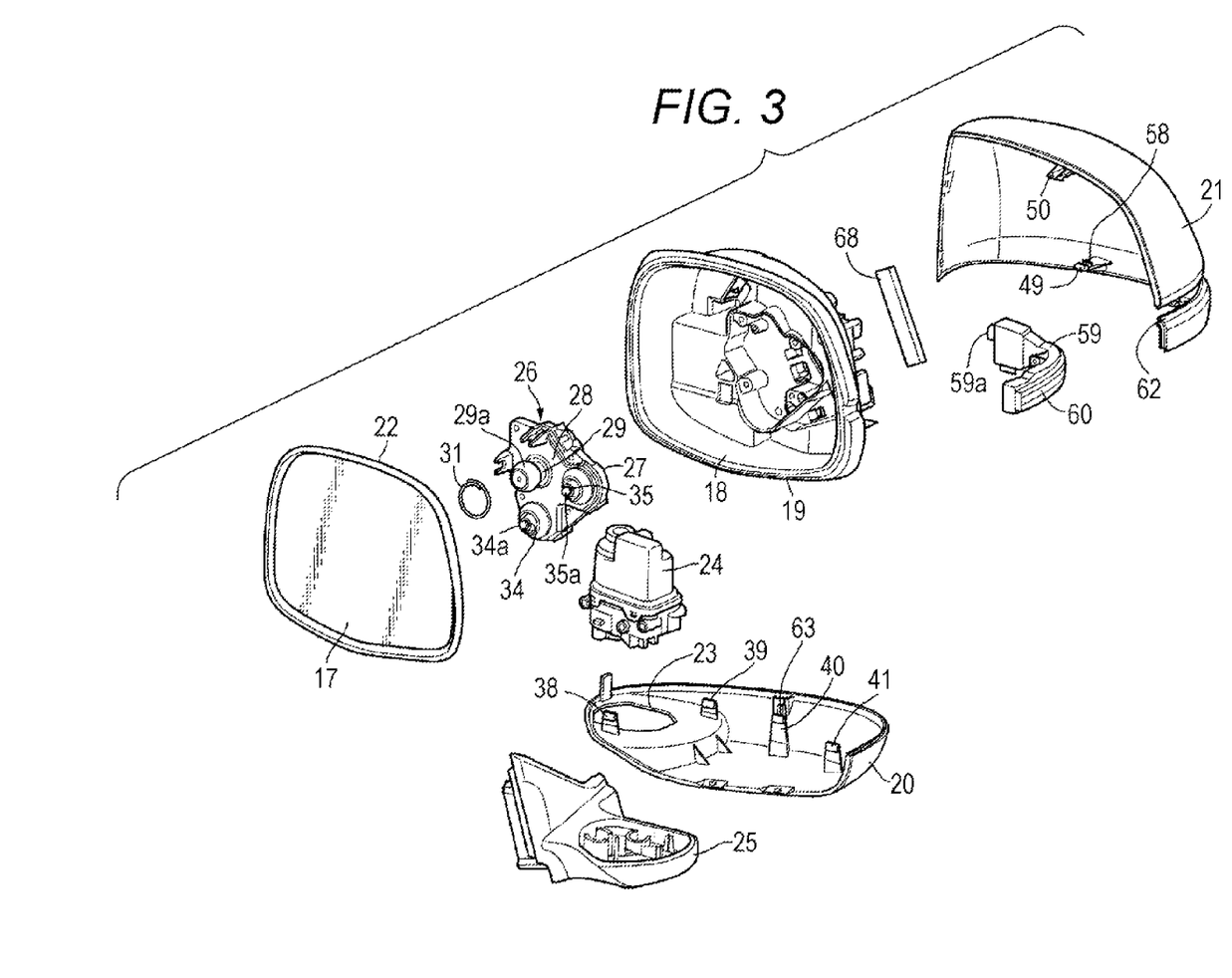
FIG. 3 is an exploded perspective view of the door mirror for a vehicle.
Figure 4:
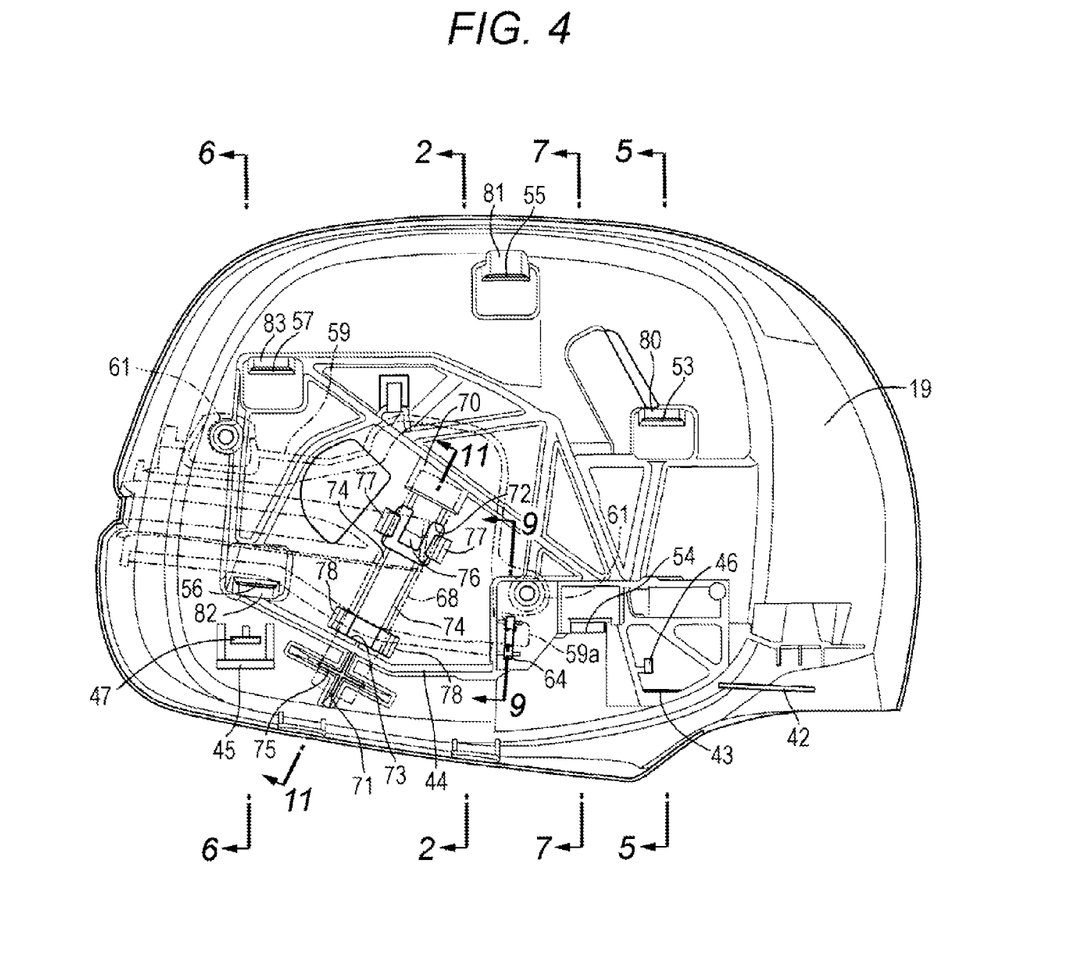
FIG. 4 is a view on arrow 4 in FIG. 2.
Figure 5:
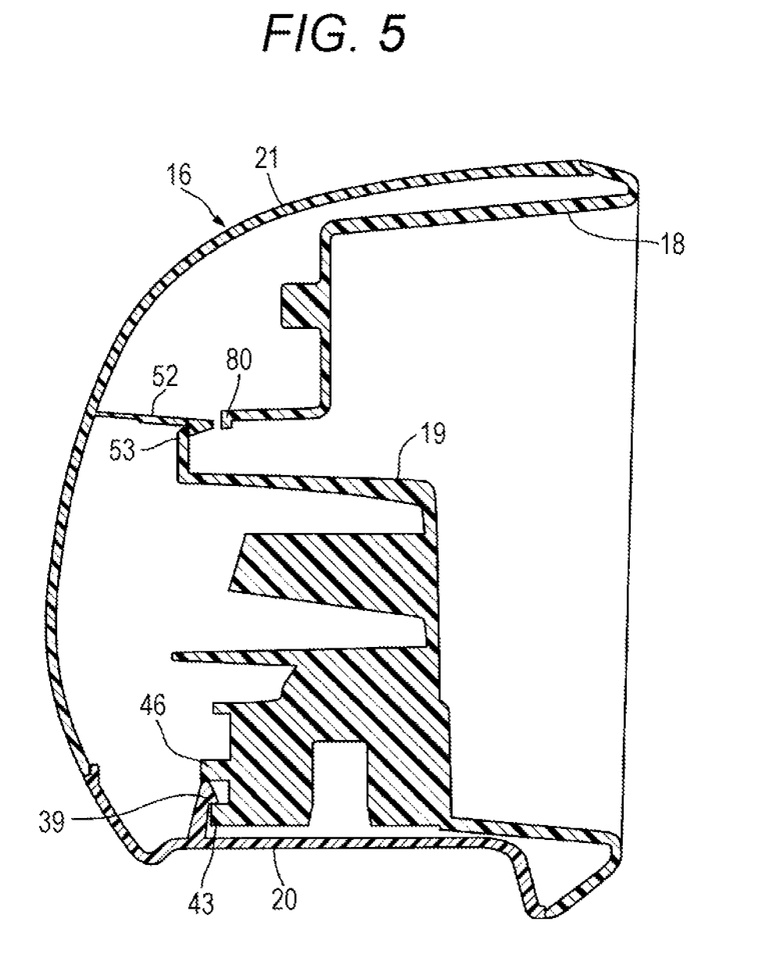
FIG. 5 is a cross-sectional view of a mirror housing that is taken along line 5-5 in FIG. 4.
Figure 6:
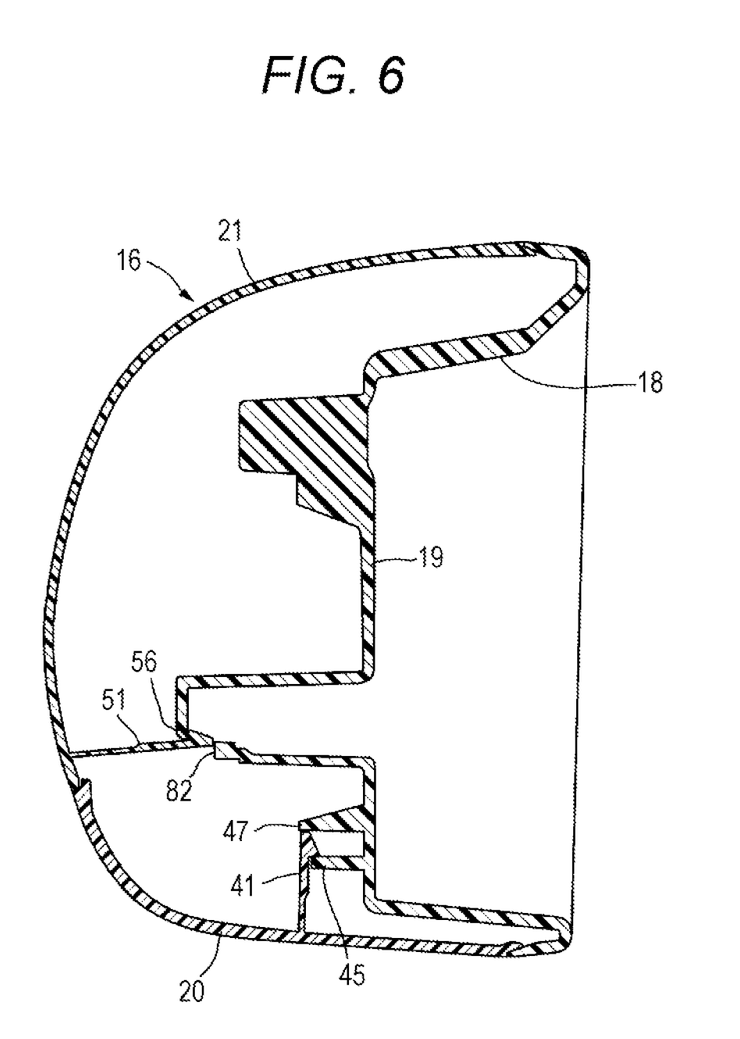
FIG. 6 is a cross-sectional view of the mirror housing that is taken along line 6-6 in FIG. 4.
Figure 7:
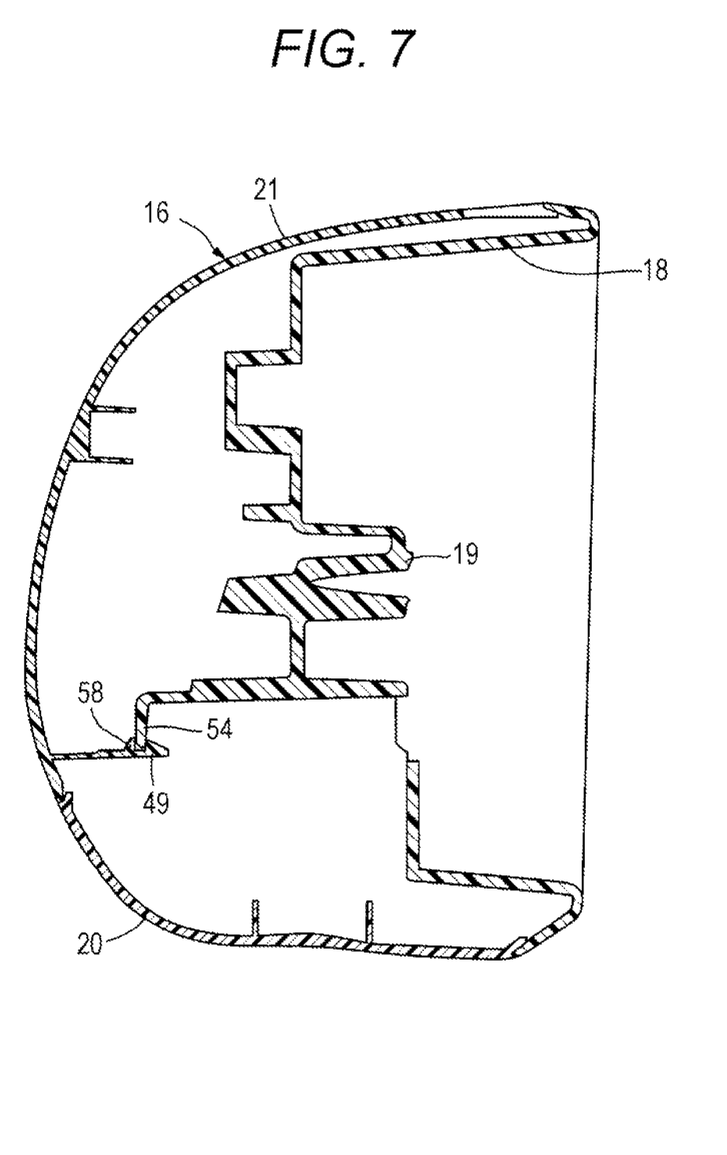
FIG. 7 is a cross-sectional view of the mirror housing that is taken along line 7-7 in FIG. 4.

Also referring to FIG. 3, an electric storage unit 24 is attached to the housing body 19. The electric storage unit 24 is arranged to penetrate a through hole 23 disposed in the lower cover 20. The housing body 19 is supported by a base member 25 that is attached to the side door via the electric storage unit 24. The mirror housing 16 turns between a standing position at which the mirror housing 16 is laterally projected from the side door and a stored position at which the mirror housing 16 is stored on the side door side by an operation of the electric storage unit 24.

An actuator case 27 for an actuator 26 that generates power for turnably driving the mirror holder 22 is housed and fixed in the housing body 19. A case member 28 that constitutes a portion of this actuator case 27 is arranged to face the mirror holder 22. A joint 29 that has a spherical section 29a at a tip thereof is projected and integrally disposed in the case member 28.

Meanwhile, a surface of the mirror holder 22 facing the case member 28 is integrally provided with a hollow-shaped fitting support section 30 to which the spherical section 29a is fitted. A ring-shaped spring 31 is fitted around an outer periphery of the fitting support section 30. The ring-shaped spring 31 retains a fitted state of the spherical section 29a to the inside of the fitting support section 30. Thus, the mirror holder 22 that holds the mirror 17 is swingably supported by the case member 28 of the actuator case 27.

A first drive shaft 34 and a second drive shaft 35 are projected to the mirror holder 22 side from the case member 28 of the actuator case 27. The first drive shaft 34 is arranged below the joint 29. The second drive shaft 35 is arranged on the lateral outside of the joint 29 in a vehicle width direction. The first drive shaft 34 and the second drive shaft 35 are independent of each other and each driven in a shaft direction. A first spherical head section 34a integrally disposed at one end of the first drive shaft 34 is swingably fitted to a shaft receiving section 36 disposed in the mirror holder 22. A second spherical head section 35a integrally disposed at one end of the second drive shaft 35 is swingably fitted to another shaft receiving section (not shown) disposed in the mirror holder 22.

In the above configuration, the mirror 17 and the mirror holder 22 are tilted forwardly and backwardly when the first drive shaft 34 is operated to advance and retreat in the shaft direction. Meanwhile, the mirror 17 and the mirror holder 22 swing to the right and left in the vehicle width direction when the second drive shaft 35 is operated to advance and retreat in the shaft direction.

Also referring to FIG. 4 to FIG. 7, a plurality of lower cover side engagement claws is disposed on an inner surface of the lower cover 20. In this embodiment, four of first to fourth lower cover side engagement claws 38, 39, 40, and 41 are arranged at positions that are spaced apart from each other. These lower cover side engagement claws 38, 39, 40, and 41 are integrally disposed on and protruded from the lower cover 20 so as to extend vertically. First to fourth lower cover locking sections 42, 43, 44, and 45 that respectively correspond to the first to fourth lower cover side engagement claws 38 to 41 are each projected in a rib shape and integrally disposed in an outer surface of the housing body 19. The first to fourth lower cover locking sections 42, 43, 44, and 45 are disposed such that the first to fourth lower cover side engagement claws 38 to 41 are respectively engaged therewith from above.

In addition, at least one of the first to fourth lower cover side engagement claws 38 to 41 is restricted from moving upward. In this embodiment, the second and fourth lower cover side engagement claws 39 and 41 are restricted from moving upward. These second and fourth lower cover side engagement claws 39 and 41 are respectively engaged with the second and fourth lower cover locking sections 43 and 45. As clearly shown in FIG. 5 and FIG. 6, a first engagement claw restricting section 46 and a second engagement claw restricting section 47 are disposed in the housing body 19. As clearly shown in FIG. 5, the first engagement claw restricting section 46 approaches and faces the second lower cover side engagement claw 39 from above. As clearly shown in FIG. 6, the second engagement claw restricting section 47 approaches and faces the fourth lower cover side engagement claw 41 from above.

Figure 8:
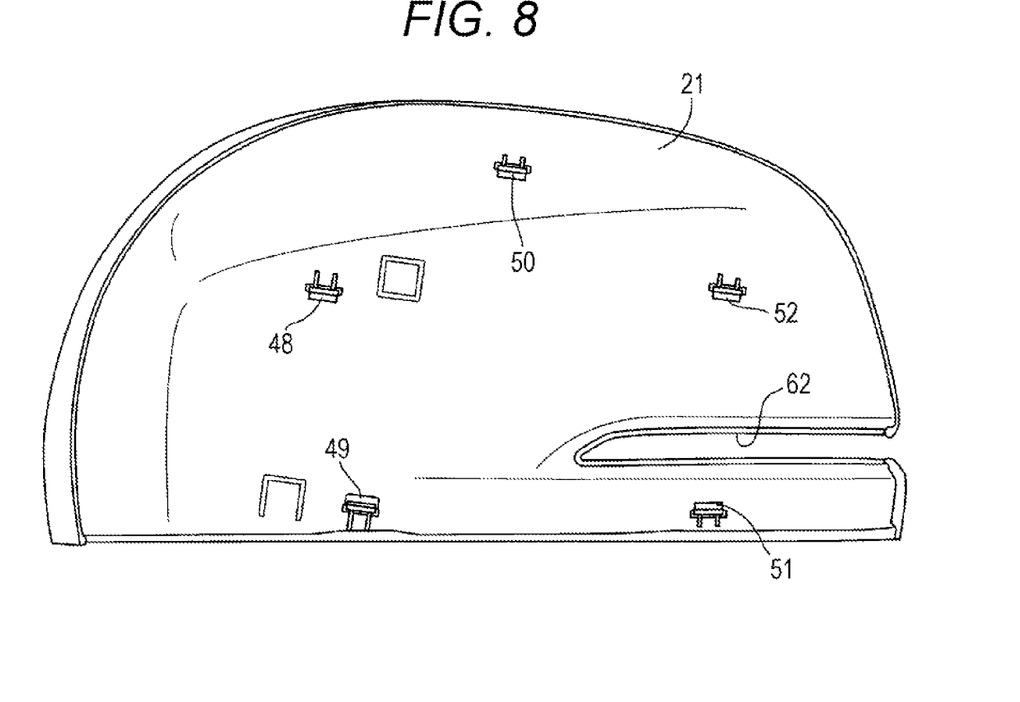
FIG. 8 is a view on arrow 8 in FIG. 2.

Also referring to FIG. 8, the upper cover 21 is engaged with the housing body 19 such that a lower end thereof is connected to an upper section of the lower cover 20. An inner surface of this upper cover 21 is provided with a plurality of upper cover side engagement claws projected to the housing body 19 side. In this embodiment, five of first to fifth upper cover side engagement claws 48, 49, 50, 51, and 52 are disposed. These first to fifth upper cover side engagement claws 48, 49, 50, 51, and 52 are integrally disposed in the upper cover 21 and projected to the housing body 19 side such that the mirror housing 16 is directed rearward in the standing position. The outer surface of the housing body 19 is provided with first to fifth upper cover locking sections 53, 54, 55, 56, and 57 that are respectively engaged with the first to fifth upper cover side engagement claws 48 to 52.

At least one of the first to fifth upper cover side engagement claws 48 to 52 is provided with a restricting projection 58. In this embodiment, as clearly shown in FIG. 7, the second upper cover side engagement claw 49 is provided with the restricting projection 58. The restricting projection 58 restricts the upper cover 21 from moving to a side that approaches the housing body 19 by abutting against the housing body 19.

In addition, of the first to fifth upper cover side engagement claws 48 to 52, the first and third to fifth upper cover side engagement claws 48 and 50 to 52 except the second upper cover side engagement claw 49 that is provided with the restricting projection 58 are respectively engaged with the first and third to fifth upper cover locking sections 53 and 55 to 57. In such engagement states, upper cover side engagement claw restricting sections 80, 81, 82, and 83 respectively restrict the upper cover side engagement claws 48 and 50 to 52 from moving to the side that approaches the housing body 19. The upper cover side engagement claw restricting sections 80, 81, 82, and 83 are disposed in the housing body 19 so as to respectively approach and face tips of the first and third to fifth upper cover side engagement claws 48 and 50 to 52.

By the way, a side turn lamp 59 is attached to the outer surface of the housing body 19 by a pair of screw members 61 and 61, for example. A slit 62 is formed in the upper cover 21 in a manner capable of facing a light emitting section 60 of the side turn lamp 59.

Figure 9:
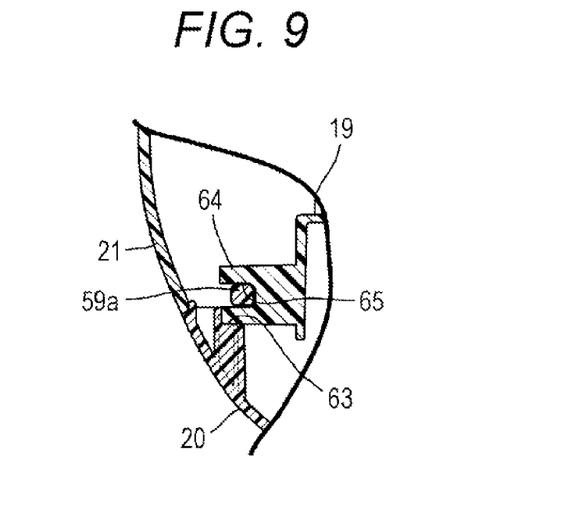
FIG. 9 is a cross-sectional view of the mirror housing that is taken along line 9-9 in FIG. 4.

Meanwhile, the outer surface of the housing body 19 is provided with a rib restricting section 64 that abuts against a rib 63 from above, the rib 63 being disposed on and protruded from the inner surface of the lower cover 20. As shown in FIG. 9, a recessed positioning section 65 is formed in the rib restricting section 64. The recessed positioning section 65 is fitted to and holds a positioning projection 59a disposed in the side turn lamp 59. In other words, the rib restricting section 64 is configured to abut against the rib 63 from above and to position and hold the side turn lamp 59.

Figure 10:
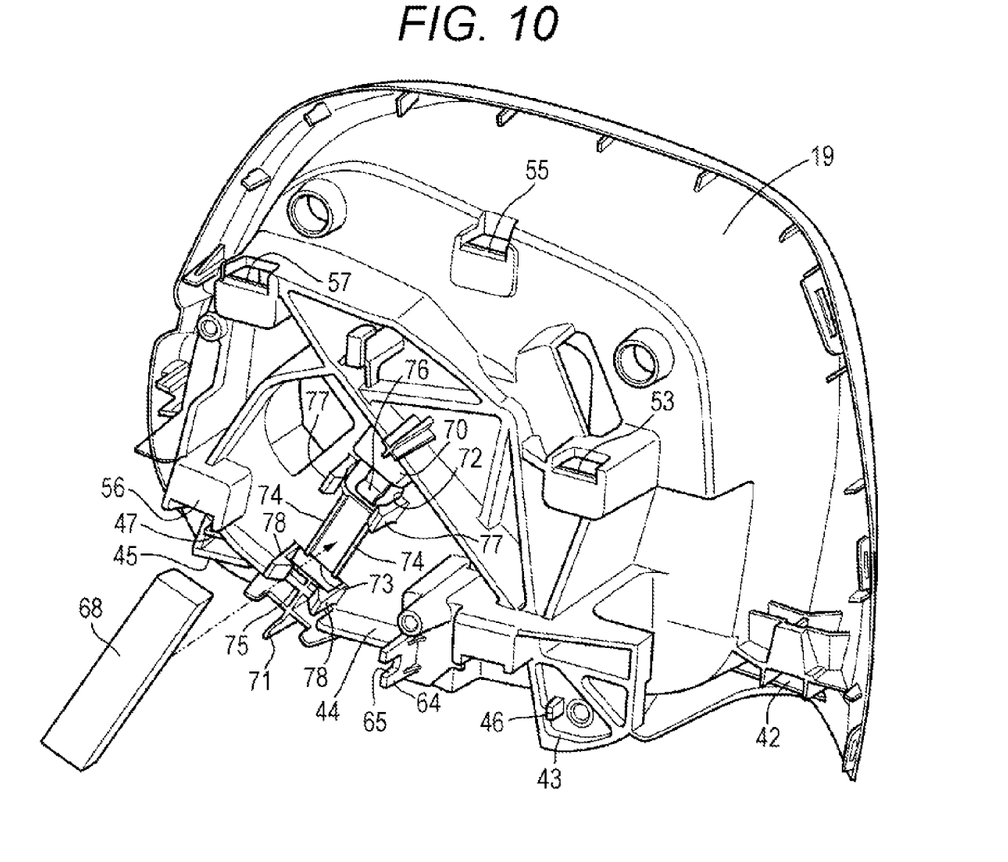
FIG. 10 is an exploded perspective view of a housing body and an antenna.
Figure 11:
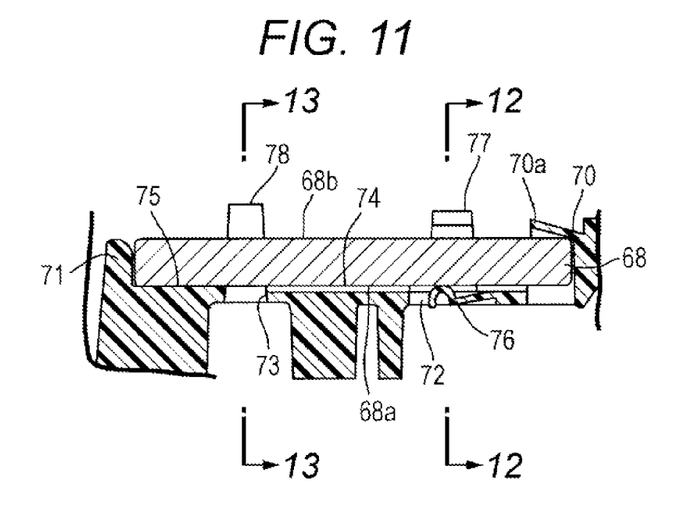
FIG. 11 is a cross-sectional view that is taken along line 11-11 in FIG. 4.

Referring to FIG. 10 and FIG. 11, a rectangular parallelepiped antenna 68 is attached to the outer surface of the housing body 19 that is covered by the lower cover 20 and the upper cover 21. The antenna 68 is attached to the outer surface of the housing body 19 such that a portion thereof is covered by the side turn lamp 59 that is attached to the outer surface of the housing body 19.

The antenna 68 is attached to the outer surface of the housing body 19 while being tilted in a manner that an upper portion thereof approaches the base member 25 side. An insertion cylinder 70 is integrally disposed on the outer surface of the housing body 19. One end of the antenna 68 in a longitudinal direction can be inserted in this insertion cylinder 70. Furthermore, a restricting projection 71 is projected and integrally disposed on and protruded from the outer surface of the housing body 19. Another end of the antenna 68 in the longitudinal direction abuts against this restricting projection 71.

Figure 12:
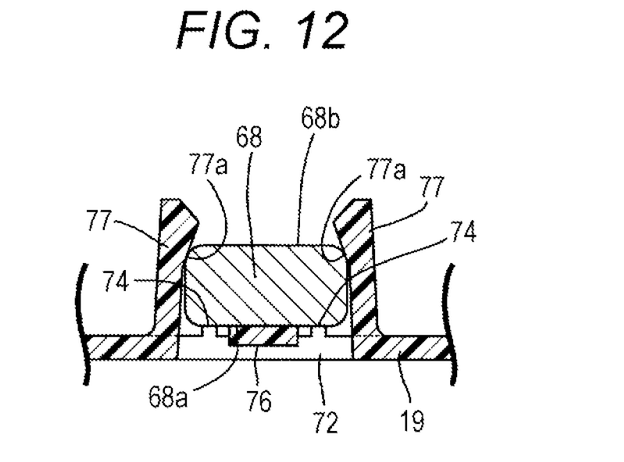
FIG. 12 is a cross-sectional view that is taken along line 12-12 in FIG. 11.
Figure 13:
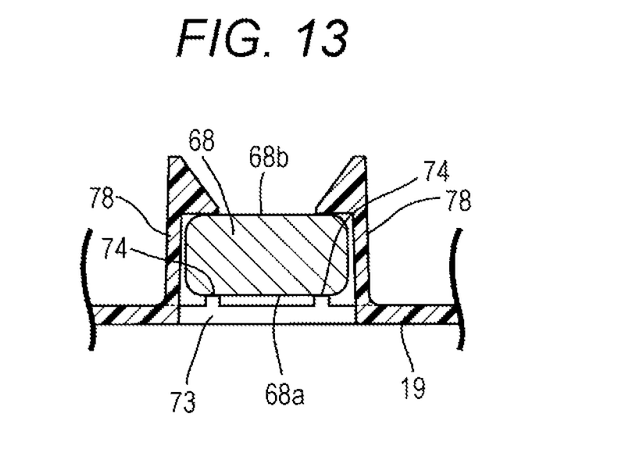
FIG. 13 is a cross-sectional view that is taken along line 13-13 in FIG. 11.

Also referring to FIG. 12 and FIG. 13, a square-shaped first opening 72 arranged near the insertion cylinder 70 and a square-shaped second opening 73 arranged near the restricting projection 71 are formed between the insertion cylinder 70 and the restricting projection 71 in the housing body 19.

A pair of support ridges 74 and 74 is disposed between the first opening 72 and the second opening 73 in the outer surface of the housing body 19. The pair of support ridges 74 and 74 extends parallel along the longitudinal direction of the antenna 68. The pair of support ridges 74, 74 is disposed on and protruded from the outer surface of the housing body 19, so as to abut against two positions that are spaced apart from each other in a width direction in one surface 68a of the antenna 68. In addition, a substantially cross-shaped support projection 75 is projected and integrally disposed at a position between the second opening 73 and the restricting projection 71 in the outer surface of the housing body 19. The support projection 75 abuts against the one surface 68a at the other end of the antenna 68. A sidewall 70a of the insertion cylinder 70 faces another surface 68b of the antenna 68. This sidewall 70a is formed to be tilted such that an opening area of the insertion cylinder 70 is increased toward an opening end side. Thus, the one end of the antenna 68 can easily be inserted in the insertion cylinder 70.

A resilient tongue piece 76 is disposed in the housing body 19 to be arranged in the first opening 72. A portion of this resilient tongue piece 76 that is near the insertion cylinder 70 resiliently abuts against the one surface 68a of the antenna 68. Furthermore, the housing body 19 is provided with a pair of first antenna engagement claws 77 and 77. The pair of first antenna engagement claws 77 and 77 is arranged in portions on both sides in the width direction of the antenna 68 that correspond to the resilient tongue piece 76. As clearly shown in FIG. 12, the first antenna engagement claws 77 and 77 have abutment surfaces 77a and 77a at tips thereof. The abutment surfaces 77a and 77a resiliently abut against and are engaged with side edges on both sides in the width direction of the other surface 68b of the antenna 68. The abutment surfaces 77a and 77a are formed to be tilted, so as to approach each other as being separated from the outer surface of the housing body 19.

The outer surface of the housing body 19 is provided with a pair of second antenna engagement claws 78 and 78. The pair of second antenna engagement claws 78 and 78 is arranged in positions on both sides of the antenna 68 in the width direction that correspond to the second opening 73. As clearly shown in FIG. 13, the second antenna engagement claws 78 and 78 are resiliently engaged with the other surface 68b of the antenna 68.

Next, advantages of this embodiment will be described. In this embodiment, the first to fourth lower cover side engagement claws 38, 39, 40, and 41 that extend vertically are integrally disposed on and protruded from the inner surface of the lower cover 20 of the mirror housing 16, the lower cover 20 covering the housing body 19 from below. The outer surface of the housing body 19 is provided with the first to fourth lower cover locking sections 42, 43, 44, and 45 that respectively correspond to the first to fourth lower cover side engagement claws 38 to 41. These first to fourth lower cover locking sections 42, 43, 44, and 45 are projected in the rib shapes from the outer surface of the housing body 19 and integrally disposed on the outer surface of the housing body 19, so as to be respectively engaged with the first to fourth lower cover side engagement claws 38 to 41 from above. The housing body 19 is provided with the engagement claw restricting section that abuts against at least one of the lower cover side engagement claws 38 to 41 from above, the lower cover side engagement claws 38 to 41 being respectively engaged with the lower cover locking sections 42 to 45. In this embodiment, the first and second engagement claw restricting sections 46 and 47 respectively abut against the second and fourth lower cover side engagement claws 39 and 41 from above, the second and fourth lower cover side engagement claws 39 and 41 being respectively engaged with the second and fourth lower cover locking section 43 and 45. Thus, even when an upward impact is applied to the lower cover 20, the first and second engagement claw restricting sections 46 and 47 respectively restrict the upward movement of at least the second and fourth lower cover side engagement claws 39 and 41, that is, the upward movement of the lower cover 20. Thus, the engagement state of the lower cover 20 with the housing body 19 is maintained. Consequently, the lower cover 20 is suppressed from being easily detached from the housing body 19.

In this embodiment, the housing body 19 is provided with the rib restricting section 64 that abuts against the rib 63 from above, the rib 63 being disposed on and protruded from the inner surface of the lower cover 20. Thus, even when the upward impact is applied to the lower cover 20, the engagement state of the lower cover 20 with the housing body 19 is further reliably maintained. In addition, the rib restricting section 64 is configured to position and hold the side turn lamp 59. Thus, there is no need to separately form in the housing body 19 a positioning and holding section for the side turn lamp 59 and a restricting section that restricts the upward movement of the lower cover 20. Therefore, the shape of the housing body 19 can be suppressed from becoming complicated.

In this embodiment, separately from the lower cover 20, the mirror housing 16 includes the upper cover 21 that covers the housing body 19 in the opposite direction from the mirror 17. Furthermore, the first to fifth upper cover side engagement claws 48, 49, 50, 51, and 52 that are projected to the housing body 19 side are disposed on and protruded from the inner surface of the upper cover 21. These first to fifth upper cover side engagement claws 48, 49, 50, 51, and 52 are disposed on and protruded from the inner surface of the upper cover 21 in a manner capable of being respectively engaged with the first to fifth upper cover locking section 53, 54, 55, 56, and 57 disposed in the housing body 19. Moreover, the restricting projection 58 is disposed in at least one of the first to fifth upper cover side engagement claws 48 to 52. In this embodiment, the restricting projection 58 is disposed in the second upper cover side engagement claw 49. The restricting projection 58 restricts the movement of the upper cover 21 to the side that approaches the housing body 19 by abutting against the housing body 19. Thus, even when the impact to the side that approaches the housing body 19 is applied to the upper cover 21, the movement of the upper cover 21 is restricted. Consequently, the engagement state of the upper cover 21 with the housing body 19 is maintained. Thus, the upper cover 21 is suppressed from being easily detached from the housing body 19.

The housing body 19 is provided with the upper cover side engagement claw restricting sections 80, 81, 82, and 83. The upper cover side engagement claw restricting sections 80, 81, 82, and 83 respectively approach and face the tips of the upper cover side engagement claws 48 and 50 to 52 that are respectively engaged with the first and third to fifth upper cover locking sections 53 and 55 to 57. Thus, even when the impact to the side that approaches the housing body 19 is applied to the upper cover 21, the upper cover 21 can be further reliably suppressed from moving to the side that approaches the housing body 19. Therefore, the engagement state of the upper cover 21 with the housing body 19 can further firmly be maintained.

The outer surface of the housing body 19 is provided with: the resilient tongue piece 76 that abuts against the one surface 68*a* of the antenna 68; and the paired first antenna engagement claws 77 and 77 that have the abutment surfaces 77*a* and 77*a* at the tips thereof. The abutment surfaces 77*a* and 77*a* are arranged in the portions on both of the sides of the antenna 68 in the width direction that correspond to the resilient tongue piece 76. Furthermore, the abutment surfaces 77*a* and 77*a* resiliently abut against and are engaged with the side edges on both of the sides in the width direction of the other surface 68*b* of the antenna 68. The abutment surfaces 77*a* and 77*a* of the first antenna engagement claws 77 and 77 are formed to be tilted, so as to approach each other as being separated from the outer surface of the housing body 19. Thus, rattling of the antenna 68 in the width direction can be suppressed. Furthermore, the rattling of the antenna 68 to a side on which the antenna 68 is separated from the housing body 19 can also be suppressed. Thus, the antenna 68 can stably be held. In addition, a dedicated member for holding the antenna 68 is unnecessary. Therefore, the number of parts can be reduced.

Furthermore, the insertion cylinder 70 in which the one end of the antenna 68 in the longitudinal direction is inserted is disposed on the outer surface of the housing body 19. Thus, the antenna 68 can be engaged with the first antenna engagement claws 77 and 77 in a state that the one end of the antenna 68 in the longitudinal direction is arranged in the insertion cylinder 70. Therefore, assembling workability of the antenna 68 can be improved. In addition, after assembly, the insertion cylinder 70 holds the one end of the antenna 68 in the longitudinal direction. Thus, the antenna 68 can stably be held.

The embodiment of the disclosure has been described so far. However, the disclosure is not limited to the above-described embodiment. Various design changes can be made without departing from the disclosure that is described in the claims.

The door mirror for a vehicle of the disclosure may be any of first to third door mirrors for a vehicle, which will be described below.

In the first door mirror for a vehicle, the mirror housing (16) is configured by including: the housing body (19) in which the mirror (17) is housed; and the plurality of covers (20, 21) including at least the lower cover (20) for covering the lower section of the housing body (19) from below and attached to the housing body (19). In the first door mirror for a vehicle, the plurality of lower cover side engagement claws (38, 39, 40, 41) extending in a vertical direction is vertically disposed on the inner surface of the lower cover (20). The housing body (19) is provided with: the lower cover locking sections (42, 43, 44, 45) configured to respectively engage the plurality of lower cover side engagement claws (38 to 41); and the engagement claw restricting sections (46, 47), each of which approaches and faces at least one of the lower cover side engagement claws (38 to 41) from above, the lower cover side engagement claws (38 to 41) being respectively engaged with the locking sections (42 to 45).

In the second door mirror for a vehicle, the housing body (19) in the first door mirror for a vehicle is provided with the rib restricting section (64) that abuts against the rib (63) from above, and the side turn lamp (59) is positioned in and held by the rib restricting section (64), the rib (63) being disposed on and protruded from the inner surface of the lower cover (20).

In the third door mirror for a vehicle, separately from the lower cover (20), the mirror housing (16) in the first or second door mirror for a vehicle includes the upper cover (21) that covers the housing body (19) in the opposite direction from the mirror (17). The plurality of upper cover side engagement claws (48, 49, 50, 51, 52) projected to the housing body (19) side are disposed on and protruded from the inner surface of the upper cover (21) in a manner capable of being respectively engaged with the plurality of upper cover locking sections (53, 54, 55, 56, 57) disposed in the housing body (19). At least one of the upper cover side engagement claws (48 to 52) is provided with the restricting projection (58) that abuts against the housing body (19) to restrict the movement of the upper cover (21) to the side that approaches the housing body (19).

According to the first door mirror for a vehicle, the housing body is provided with: the lower cover locking sections that are respectively engaged with the plurality of lower cover side engagement claws disposed on the inner surface of the lower cover and extend vertically; and the engagement claw restricting section that approaches and faces at least one of the lower cover side engagement claws from above. Thus, even when the upward impact is applied to the lower cover, the engagement claw restricting section restricts the upward movement of at least one of the lower cover side engagement claws, that is, the upward movement of the lower cover. Therefore, the engagement state of the lower cover with the housing body is maintained, and the lower cover is prevented from being easily detached from the housing body.

According to the second door mirror for a vehicle, the housing body is provided with the rib restricting section that abuts against the rib from above, the rib being disposed on and protruded from the inner surface of the lower cover. Thus, even when the upward impact is applied to the lower cover, the engagement state of the lower cover with the housing body is further reliably maintained. Furthermore, since the side turn lamp is positioned in and held by the rib restricting section, there is no need to separately form in the housing body the positioning and holding section for the side turn lamp and the restricting section that restricts the upward movement of the lower cover. Therefore, the shape of the housing body can be prevented from becoming complicated.

According to the third door mirror for a vehicle, the plurality of upper cover side engagement claws disposed on and protruded from the inner surface of the upper cover can be respectively engaged with the upper cover locking sections of the housing body, and the restricting projection disposed in at least one of the upper cover side engagement claws abuts against the housing body to restrict the movement of the upper cover to the side that approaches the housing body, the upper cover covering the housing body in the opposite direction from the mirror. Thus, even when the impact to the side that approaches the housing body is applied to the upper cover, the movement of the upper cover is restricted, and the engagement state of the upper cover with the housing body is maintained. Therefore, the upper cover is prevented from being easily detached from the housing body.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:
1. A door mirror for a vehicle comprising:
   a mirror housing (16) comprising:
      a housing body (19) disposed in the mirror housing (16) and configured to house a mirror (17); and
      a lower cover (20) disposed in the mirror housing (16) and covers a lower section of the housing body (19) from below;
   wherein the lower cover comprises a plurality of lower cover side engagement claws (38 to 41) vertically disposed on an inner surface of the lower cover (20) and extending in a vertical direction; and
   the housing body comprises:
   a plurality of lower cover locking projections (42 to 45) protruded from the housing body (19) and respectively engaged with the plurality of lower cover side engagement claws (38 to 41); and
   a plurality of lower cover restricting projections (46 and 47), each of which is protruded from the housing body (19) and approaches and faces at least one of the lower cover side engagement claws (38 to 41) from above and is in direct contact with a top surface in the vertical direction of the lower cover side engagement claw, the lower cover side engagement claws (38 to 41) being respectively engaged with the lower cover locking projections (42 to 45).

2. The door mirror for a vehicle according to claim 1, wherein the lower cover comprises a rib (63) disposed on and protruded from the inner surface of the lower cover (20); and
   the housing body further comprises a rib restricting projection (64) protruded from the housing body (19) and configured to abut against the rib (63) from above and position and hold a side turn lamp (59).

3. The door mirror for a vehicle according to claim 1 further comprising:
   an upper cover (21) disposed in the mirror housing (16) and configured to cover the housing body (19) in the opposite direction from the mirror (17);
   a plurality of upper cover side engagement claws (48 to 52) disposed on and protruded from an inner surface of the upper cover (21) and projected to the housing body (19) side;
   a plurality of upper cover locking projections (53 to 57) protruded from the housing body (19) in a manner capable of being respectively engaged with the plurality of upper cover side engagement claws (48 to 52); and an upper cover restricting projection (58) disposed in at least one of the plurality of upper cover side engagement claws (48 to 52) and configured to restrict movement of the upper cover (21) to a side that approaches the housing body (19) by abutting against the housing body (19).

4. The door mirror for a vehicle according to claim 2 further comprising:

an upper cover (21) disposed in the mirror housing (16) and configured to cover the housing body (19) in the opposite direction from the mirror (17);

a plurality of upper cover side engagement claws (48 to 52) disposed on and protruded from an inner surface of the upper cover (21) and projected to the housing body (19) side;

a plurality of upper cover locking projections (53 to 57) protruded from the housing body (19) in a manner capable of being respectively engaged with the plurality of upper cover side engagement claws (48 to 52); and an upper cover restricting projection (58) disposed in at least one of the plurality of upper cover side engagement claws (48 to 52) and configured to restrict movement of the upper cover (21) to a side that approaches the housing body (19) by abutting against the housing body (19).

5. The door mirror for a vehicle according to claim 3 further comprising:

upper cover side engagement claw restricting projections (80 to 83) disposed in and protruded from the housing body (19) and respectively configured to approach and face tips of the upper cover side engagement claws (48 to 52), the upper cover side engagement claws (48 to 52) being respectively engaged with the upper cover locking projections (53 to 57).

6. The door mirror for a vehicle according to claim 4 further comprising:

upper cover side engagement claw restricting projections (80 to 83) disposed in and protruded from the housing body (19) and respectively configured to approach and face tips of the upper cover side engagement claws (48 to 52), the upper cover side engagement claws (48 to 52) being respectively engaged with the upper cover locking projections (53 to 57).

7. The door mirror for a vehicle according to claim 1 further comprising:

an antenna (68) disposed on an outer surface of the housing body (19);

a resilient tongue piece (76) configured to abut against one surface (68*a*) of the antenna (68); and a pair of first antenna engagement claws (77) comprising first and second abutment surfaces (77*a*), respectively, wherein the first and second abutment surfaces (77*a*) of the pair of first antenna engagement claws (77) are formed to be tilted, so as to approach each other as being separated from the outer surface of the housing body (19).

8. The door mirror for a vehicle according to claim 7, further comprising:

an insertion cylinder (70) disposed on the outer surface of the housing body (19), wherein one end of the antenna (68) in a longitudinal direction is disposed in the insertion cylinder (70).

* * * * *